(12) United States Patent
Yoshida

(10) Patent No.: US 10,994,700 B2
(45) Date of Patent: May 4, 2021

(54) PROCESSING DEVICE, PROCESSING METHOD, AND COMPUTER PROGRAM

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Ryota Yoshida, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/647,802

(22) PCT Filed: Sep. 6, 2018

(86) PCT No.: PCT/JP2018/033036
§ 371 (c)(1),
(2) Date: Mar. 16, 2020

(87) PCT Pub. No.: WO2019/058985
PCT Pub. Date: Mar. 28, 2019

(65) Prior Publication Data
US 2020/0254973 A1    Aug. 13, 2020

(30) Foreign Application Priority Data
Sep. 21, 2017    (JP) .............................. JP2017-181794

(51) Int. Cl.
*H04W 24/00* (2009.01)
*B60R 25/24* (2013.01)
(Continued)

(52) U.S. Cl.
CPC .......... *B60R 25/245* (2013.01); *G01S 5/0221* (2013.01); *H04W 4/029* (2018.02); *H04W 4/40* (2018.02); *E05B 81/77* (2013.01)

(58) Field of Classification Search
CPC ...... B60R 25/245; H04W 4/029; H04W 4/40; H04W 4/48; H04W 4/44; G01S 5/0221;
(Continued)

(56) References Cited

U.S. PATENT DOCUMENTS

2010/0317366 A1   12/2010   Shen et al.
2015/0325138 A1*   11/2015   Selinger .................. G09B 7/00
                                                                                       434/322
2017/0136992 A1   5/2017   Hamada et al.

FOREIGN PATENT DOCUMENTS

JP         2010-087896 A      4/2010
JP         2010087896 A  *   4/2010
(Continued)

OTHER PUBLICATIONS

Li Yang, Tower Region auto-positioning algorithm and its implementation, 2010 2nd international Asia conference on informatics in control automation and robotics (Year: 2010).*

(Continued)

*Primary Examiner* — Tanmay K Shah
(74) *Attorney, Agent, or Firm* — Honigman LLP (57) ABSTRACT

A processing device that processes detection strengths detected at a first detection position and a second detection position by a detector for detecting detection targets generated from a plurality of sources, includes a two-dimensionalization unit converting detection strengths a pair of sources into a two-dimensional distribution of coordinate points in which the detection strength for one source is represented by an X-axis value, and the detection strength for the other source is represented by a Y-axis value; a demarcation unit demarcating in the two-dimensional distribution of coordi- (Continued)

nate points, a predetermined region including a mixed region in which coordinate points relating to the first detection position and coordinate points relating to the second detection position are mixed; and a replacement unit replacing the two-dimensional distribution of coordinate points in a demarcated region that has been demarcated, with a two-dimensional distribution of coordinate points relating to another pair of sources.

8 Claims, 9 Drawing Sheets

(51) Int. Cl.
  *H04W 4/029* (2018.01)
  *H04W 4/40* (2018.01)
  *G01S 5/02* (2010.01)
  *E05B 81/76* (2014.01)

(58) Field of Classification Search
  CPC .... G01S 5/012; G01S 5/02521; G01S 5/0036; G01S 2205/01; G01S 5/0284; E05B 81/77; E05B 49/00; H04Q 9/00

USPC ...................................................... 455/456.1
See application file for complete search history.

(56) References Cited

FOREIGN PATENT DOCUMENTS

| JP | 2011002243 A | * | 1/2011 | ............. G01S 19/48 |
|----|----|----|----|----|
| JP | 5437959 B2 | * | 3/2014 | ............. G01S 11/06 |
| JP | 5437959 B2 | | 3/2014 | |
| JP | 2016008485 A | * | 1/2016 | ........... H04B 17/318 |
| JP | 2016-030892 A | | 3/2016 | |
| JP | 2016030892 A | * | 3/2016 | |
| JP | 2017-067502 A | | 4/2017 | |
| JP | 2017067502 A | * | 4/2017 | |
| JP | 2017-082518 A | | 5/2017 | |
| JP | 2017082518 A | * | 5/2017 | ............. B60R 25/24 |

OTHER PUBLICATIONS

International Search Report, Application No. PCT/JP2018/033036, dated Dec. 11, 2018. ISA/Japan Patent Office.

* cited by examiner

PROCESSING DEVICE, PROCESSING METHOD, AND COMPUTER PROGRAM

CROSS-REFERENCE TO RELATED APPLICATIONS

This application is the U.S. national stage of PCT/JP2018/033036 filed on Sep. 6, 2018, which claims priority of Japanese Patent Application No. JP 2017-181794 filed on Sep. 21, 2017, the contents of which are incorporated herein.

TECHNICAL FIELD

The present disclosure relates to a processing device, a processing method, and a computer program.

BACKGROUND

For example, in Japanese Patent No. 5437959, in an X-Y orthogonal coordinate system in which a driver's seat-side reception signal strength Hd with which radio waves from a driver's seat antenna have been received by an electronic key and a passenger seat-side reception signal strength Hp with which radio waves from a passenger seat antenna have been received by the electronic key are represented by the X axis and the Y axis, respectively, a determination line L serving as a reference for determining the position (inside or outside the vehicle), which has been constructed by a plurality of linear expressions, of the electronic key is defined. Also, a communication terminal position determination device is disclosed that determines the position of the electronic key based on the position, relative to the determination line L, of coordinate points P determined from the driver's seat-side reception signal strength Hd and the passenger seat-side reception signal strength Hp.

Meanwhile, as described above, in order to determine a determination expression for determining whether the position of the electronic key is located inside or outside the vehicle, the reception signal strengths of the radio waves received by the electronic key inside and outside the vehicle are detected, and a determination expression for the above-described determination is derived based on the results of the detection.

That is, reception signal strengths with which detection targets (radio waves) generated from a plurality of sources including the driver's seat antenna and the passenger seat antenna are received (detected) by the electronic key are detected inside and outside the vehicle. Then, from the results of the detection, a determination expression for separating the reception signal strengths detected in the interior of the vehicle and the reception signal strengths detected outside the vehicle is obtained. Thereafter, the position of the electronic key is determined using the reception signal strengths and the determination expression.

Therefore, in order to obtain an accurate determination expression, it is necessary to clearly divide the reception signal strengths relating to the vehicle interior from the reception signal strengths relating to the vehicle exterior. In the actual results of detecting the reception signal strengths, a portion in which reception signal strengths detected inside and outside the vehicle overlap or are mixed is often present, and it is difficult to clearly divide these reception signal strengths from each other. However, such a problem cannot be solved by the communication terminal position determination device of Japanese Patent No. 5437959 described above.

Therefore, it is an object of the present disclosure to provide a processing device, a processing method, and a computer program that make it possible to clearly divide, for detection strengths detected at a first detection position and a second detection position by a detector for detecting detection targets generated from a plurality of sources, detection results relating to the first detection position from detection results relating to the second detection position.

SUMMARY

A processing device according to an aspect of the present disclosure is a processing device that processes, for each detection position, detection strengths detected at a first detection position and a second detection position by a detector for detecting detection targets generated from a plurality of sources, the processing device including: a two-dimensionalization unit configured to convert detection strengths for any one pair of sources into a two-dimensional distribution of coordinate points in which the detection strength for one source is represented by an X-axis value, and the detection strength for the other source is represented by a Y-axis value; a demarcation unit configured to demarcate, in the two-dimensional distribution of coordinate points, a predetermined region including a mixed region in which coordinate points relating to the first detection position and coordinate points relating to the second detection position are mixed; and a replacement unit configured to replace the two-dimensional distribution of coordinate points in a demarcated region that has been demarcated, with a two-dimensional distribution of coordinate points relating to another pair of sources.

A processing method according to an aspect of the present disclosure is a processing method for processing, for each detection position, detection strengths detected at a first detection position and a second detection position by a detector for detecting detection targets generated from a plurality of sources, the processing method including the steps of converting detection strengths for any one pair of sources into a two-dimensional distribution of coordinate points in which the detection strength for one source is represented by an X-axis value, and the detection strength for the other source is represented by a Y-axis value; demarcating, in the two-dimensional distribution of coordinate points, a predetermined region including a mixed region in which coordinate points relating to the first detection position and coordinate points relating to the second detection position are mixed; and replacing the two-dimensional distribution of coordinate points in a demarcated region that has been demarcated, with a two-dimensional distribution of coordinate points relating to another pair of sources.

A computer program according to an aspect of the present disclosure is a computer program for causing a computer to execute processing for, based on detection strengths detected at a first detection position and a second detection position by a detector for detecting detection targets generated from a plurality of sources, converting detection strengths for any one pair of sources into a two-dimensional distribution of coordinate points in which the detection strength for one source is represented by an X-axis value, and the detection strength for the other source is represented by a Y-axis value; demarcating, in the two-dimensional distribution of coordinate points, a predetermined region including a mixed region in which coordinate points relating to the first detection position and coordinate points relating to the second detection position are mixed; and replacing the two-dimensional distribution of coordinate points in a demarcated region that has been demarcated, with a two-dimensional distribution of coordinate points relating to another pair of sources.

Note that the present disclosure can be implemented not only as a processing device including the above-described distinctive processing unit, but also as a processing method including the above-described distinctive processing as steps, or as a computer program for causing a computer to execute the steps.

Furthermore, the present disclosure can be implemented as a semiconductor integrated circuit that implements part or all of the processing device, or as another system including the processing device.

Effects of the Present Disclosure

According to the present disclosure, it is possible to clearly divide, for detection strengths detected at a first detection position and a second detection position by a detector for detecting detection targets generated from a plurality of sources, detection results relating to the first detection position from detection results relating to the second detection position.

DESCRIPTION OF EMBODIMENTS OF THE PRESENT DISCLOSURE

First, aspects of the present disclosure will be listed and described. At least some of the embodiments described below may be combined freely.

A processing device according to an aspect of the present disclosure is a processing device that processes, for each detection position, detection strengths detected at a first detection position and a second detection position by a detector for detecting detection targets generated from a plurality of sources, the processing device including: a two-dimensionalization unit configured to convert detection strengths for any one pair of sources into a two-dimensional distribution of coordinate points in which the detection strength for one source is represented by an X-axis value, and the detection strength for the other source is represented by a Y-axis value; a demarcation unit configured to demarcate, in the two-dimensional distribution of coordinate points, a predetermined region including a mixed region in which coordinate points relating to the first detection position and coordinate points relating to the second detection position are mixed; and a replacement unit configured to replace the two-dimensional distribution of coordinate points in a demarcated region that has been demarcated, with a two-dimensional distribution of coordinate points relating to another pair of sources.

In the processing device according to the above-described aspect, the two-dimensionalization unit converts detection strengths for any one pair of sources, the detection strengths having been detected by the detector, into a two-dimensional distribution of coordinate points. In the two-dimensional distribution of coordinate points represented in this manner, the demarcation unit demarcates a predetermined region including a mixed region of coordinate points relating to the first detection position and coordinate points relating to the second detection position. The replacement unit replaces the two-dimensional distribution of coordinate points in a demarcated region that has been demarcated, with a two-dimensional distribution of coordinate points relating to another pair of sources.

Accordingly, of the detection strengths (two-dimensional distribution of coordinate points) for the one pair of sources, the mixed region of the coordinate points relating to the first detection position and the coordinate points relating to the second detection position can be replaced with the two-dimensional distribution of coordinate points relating to another pair of sources for which the degree of mixing of coordinate points is low, thus increasing the accuracy in processing for each detection position.

A processing device according to an aspect of the present disclosure includes: a calculation unit configured to calculate, after the replacement performed by the replacement unit, a primary expression for dividing the coordinate points relating to the first detection position from the coordinate points relating to the second detection position.

In the processing device according to the above-described aspect, after the replacement performed by the replacement unit, the coordinate points relating to to the first detection position are divided from the coordinate points relating to the second detection position, using the primary expression calculated by the calculation unit.

Accordingly, it is possible to clearly divide the coordinate points relating to the first detection position from the coordinate points relating to the second detection position, and it is therefore possible to increase the accuracy in processing for each detection position.

In a processing device according to an aspect of the present disclosure, the plurality of sources are three or more sources, the processing device includes a first selection unit configured to select a source pair for which a mixing ratio at which the coordinate points relating to the first detection position and the coordinate points relating to the second detection position are mixed in the two-dimensional distribution of coordinate points is smallest, and the demarcation unit demarcates the predetermined region for a selected source pair that has been selected by the first selection unit.

In the processing device according to the above-described aspect, the demarcation unit demarcates the predetermined region for a source pair for which a mixing ratio at which the coordinate points relating to the first detection position and the coordinate points relating to the second detection position are mixed is smallest.

Accordingly, the number of regions to be replaced by the replacement unit can be reduced to as small as possible, and it is therefore possible to reduce the amount of data processing, and to further increase the accuracy in processing for each detection position.

A processing device according to an aspect of the present disclosure includes: a second selection unit configured to select another source pair for which the mixing ratio in a corresponding region corresponding to the demarcated region is smaller than the mixing ratio in the demarcated region, wherein the replacement unit replaces the two-dimensional distribution of coordinate points in the demarcated region with the two-dimensional distribution of coordinate points in the corresponding region for the source pair selected by the second selection unit.

In the processing device according to the above-described aspect, the two-dimensional distribution of coordinate points in the demarcated region is replaced with the two-dimensional distribution of coordinate points in the corresponding region of another source pair for which the mixing ratio in the corresponding region is smaller than the mixing ratio in the demarcated region.

Accordingly, it is possible to increase the accuracy in processing for detection position, as compared with a case where such replacement is not performed.

A processing device according to an aspect of the present disclosure includes: a determination unit configured to determine, for the source pair selected by the second selection unit, whether or not a mixing ratio of coordinate points in the corresponding region is greater than a predetermined threshold; and a data reduction unit configured to perform, based on a result of the determination, processing for reducing the number of data pieces for the detection strengths.

In the processing device according to the above-described aspect, for example, when it is determined by the determination unit that the mixing ratio of coordinate points in the corresponding region is greater than a predetermined threshold, the data reduction unit reduces the number of data pieces for the detection strengths. Thereafter, based on the detection strengths for which the number of data pieces has been reduced, each of the processing by the two-dimensionalization unit, the first selection unit, the demarcation unit, the second selection unit, and the replacement unit is performed.

Accordingly, even if the mixing ratio of the coordinate points relating to the first detection position and the coordinate points relating to the second detection position is high, it is possible to increase the accuracy in processing for each detection position.

A processing method according to an aspect of the present disclosure is a processing method for processing, for each detection position, detection strengths detected at a first detection position and a second detection position by a detector for detecting detection targets generated from a plurality of sources, the processing method including the steps of converting detection strengths for any one pair of sources into a two-dimensional distribution of coordinate points in which the detection strength for one source is represented by an X-axis value, and the detection strength for the other source is represented by a Y-axis value; demarcating, in the two-dimensional distribution of coordinate points, a predetermined region including a mixed region in which coordinate points relating to the first detection position and coordinate points relating to the second detection position are mixed; and replacing the two-dimensional distribution of coordinate points in a demarcated region that has been demarcated, with a two-dimensional distribution of coordinate points relating to another pair of sources.

In the processing method according to the above-described aspect, detection strengths for any one pair of sources, the detection strengths having been detected by the detector, are converted into a two-dimensional distribution of coordinate points. In the two-dimensional distribution of coordinate points represented in this manner, a predetermined region including a mixed region of coordinate points relating to the first detection position and coordinate points relating to the second detection position is demarcated, and the two-dimensional distribution of coordinate points in a demarcated region that has been demarcated is replaced with a two-dimensional distribution of coordinate points relating to another pair of sources.

Accordingly, of the detection strengths (two-dimensional distribution of coordinate points) for the one pair of sources, the mixed region of the coordinate points relating to the first detection position and the coordinate points relating to the second detection position can be replaced with the two-dimensional distribution of coordinate points relating to another pair of sources for which the degree of mixing of coordinate points is low, thus increasing the accuracy in processing for each detection position.

A computer program according to an aspect of the present disclosure is a computer program for causing a computer to execute processing for, based on detection strengths detected at a first detection position and a second detection position by a detector for detecting detection targets generated from a plurality of sources, converting detection strengths for any one pair of sources into a two-dimensional distribution of coordinate points in which the detection strength for one source is represented by an X-axis value, and the detection strength for the other source is represented by a Y-axis value; demarcating, in the two-dimensional distribution of coordinate points, a predetermined region including a mixed region in which coordinate points relating to the first detection position and coordinate points relating to the second detection position are mixed; and replacing the two-dimensional distribution of coordinate points in a demarcated region that has been demarcated, with a two-dimensional distribution of coordinate points relating to another pair of sources.

In the computer program according to the above-described aspect, detection strengths for any one pair of sources, the detection strengths having been detected by the detector, are converted into a two-dimensional distribution of coordinate points. In the two-dimensional distribution of coordinate points represented in this manner, a predetermined region including a mixed region of coordinate points relating to the first detection position and coordinate points relating to the second detection position is demarcated, and the two-dimensional distribution of coordinate points in a demarcated region that has been demarcated is replaced with the two-dimensional distribution of coordinate points relating to another pair of sources.

Accordingly, of detection strengths (two-dimensional distribution of coordinate points) for the one pair of sources, the mixed region of the coordinate points relating to the first detection position and the coordinate points relating to the second detection position can be replaced with the two-dimensional distribution of coordinate points relating to another pair of sources for which the degree of mixing of coordinate points is low, thus increasing the accuracy in processing for each detection position.

Specific examples of a processing device, a processing method, and a computer program according to an embodiment of the present disclosure will be described with reference to the drawings. It should be noted that the present disclosure is not limited to these examples, but is defined by the claims, and is intended to include all modifications which fall within the scope of the claims and the meaning and scope of equivalents thereof.

For the sake of convenience of description, the following description will be given taking, as an example, a case where the source, the detection target, and the detection position described in the claims are a transmission antenna provided in a vehicle, a signal (radio waves) transmitted by the transmission antenna, and inside/outside the vehicle, respectively.

However, the present embodiment is not limited thereto. For example, aside from radio waves, the detection target may be light, heat, sound, or the like.

Figure 1:
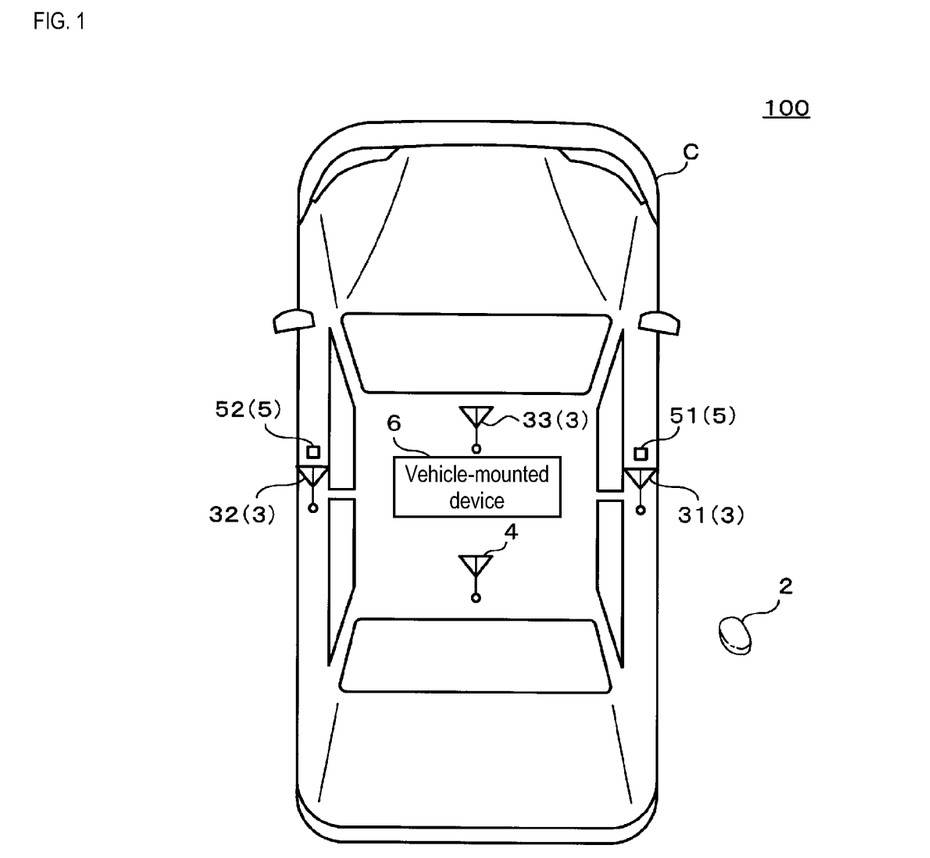
FIG. 1 is a schematic diagram showing an example of the configuration of a vehicle communication system.

FIG. 1 is a schematic diagram showing an example of the configuration of a vehicle communication system 100. The vehicle communication system 100 shown in FIG. 1 includes a vehicle-mounted device 6 that transmits and receives various signals using three transmission antennas 3 and one reception antenna 4 provided on a vehicle C, and a portable device 2 (detector) that transmits and receive signals to and from the vehicle-mounted device 6.

The three transmission antennas 3 include a first transmission antenna 31, a second transmission antenna 32, and a third transmission antenna 33. The first transmission antenna 31 is provided on a pillar located on the driver's seat side, and the second transmission antenna 32 is provided on a pillar located on the passenger seat side. The first transmission antenna 31, the second transmission antenna 32, and the third transmission antenna 33 transmit signals to the portable device 2.

The third transmission antenna 33 is provided at the central portion in the compartment of the vehicle C. For example, when the vehicle C includes a driver's seat, a passenger seat, and a row of rear seats, the third transmission antenna 33 is provided at a suitable portion, such as an armrest or a console box, provided between the driver's seat and the passenger seat.

In the following, the first transmission antenna 31, the second transmission antenna 32, and the third transmission antenna 33 may also be abbreviated as transmission antennas 31, 32, and 33.

The reception antenna 4 is provided at the central portion of the rear seats. For example, the reception antenna 4 is provided at a suitable location, such as below the center seat of the rear seats or on a backrest. Note that in the present embodiment, the right side in the traveling direction of the vehicle C is the driver's seat side, and the left side in the traveling direction is the passenger seat side. The reception antenna 4 receives a response signal, which will be described below, from the portable device 2.

The vehicle C is provided with a plurality of vehicle door request switches 5 on the outer surface thereof. Specifically, the door handle on the outside of the driver's seat is provided with a first vehicle door request switch 51, and the door handle on the outside of the passenger seat is provided with a second vehicle door request switch 52. Each of the vehicle door request switches 5 is formed by, for example, a depressing switch for locking or unlocking the door on which the switch is provided, or a contact sensor for detecting contact of the user's hand with the handle of the door. Note that each of the vehicle door request switches 5 may separately include a configuration for locking the door on which the switch is provided, and a configuration for unlocking the door.

The vehicle-mounted device 6 wirelessly transmits signals for determining the position of the portable device 2 via the transmission antennas 31, 32, and 33. The portable device 2 receives each of the signals transmitted from the transmission antennas 31, 32, and 33, and measures (detects) the reception signal strength (detection strength) of the received signal. For each of the signals transmitted by the vehicle-mounted device 6, the portable device 2 wirelessly transmits a response signal including the measured reception signal strength to the vehicle-mounted device 6. The vehicle-mounted device 6 receives the response signal transmitted from the portable device 2, determines, based on the reception signal strength included in the received response signal, whether the user (portable device 2) is located inside or outside the vehicle, and performs predetermined processing corresponding to the result of the determination. For example, the vehicle-mounted device 6 performs processing such as locking/unlocking of the vehicle door, starting of the engine, or alerting the user that the vehicle door has been left open.

The above-described determination of the location of the portable device 2 is performed based on a predetermined determination expression. This determination expression is calculated from the results of the measurement of reception signal strengths that has been performed in advance.

The portable device 2 measures, at a plurality of locations inside and outside the vehicle, the reception signal strengths for the signals transmitted from the transmission antennas 31, 32, and 33. The results of the measurement by the portable device 2 inside and outside the vehicle are represented together as a two-dimensional coordinate system. From the distribution of the measurement results on the two-dimensional coordinate system, a determination expression for dividing the results of the measurement performed inside the vehicle from the results of the measurement performed outside the vehicle is obtained, and the determination expression is used as a determination expression for determining the location of the portable device 2.

Figure 2:
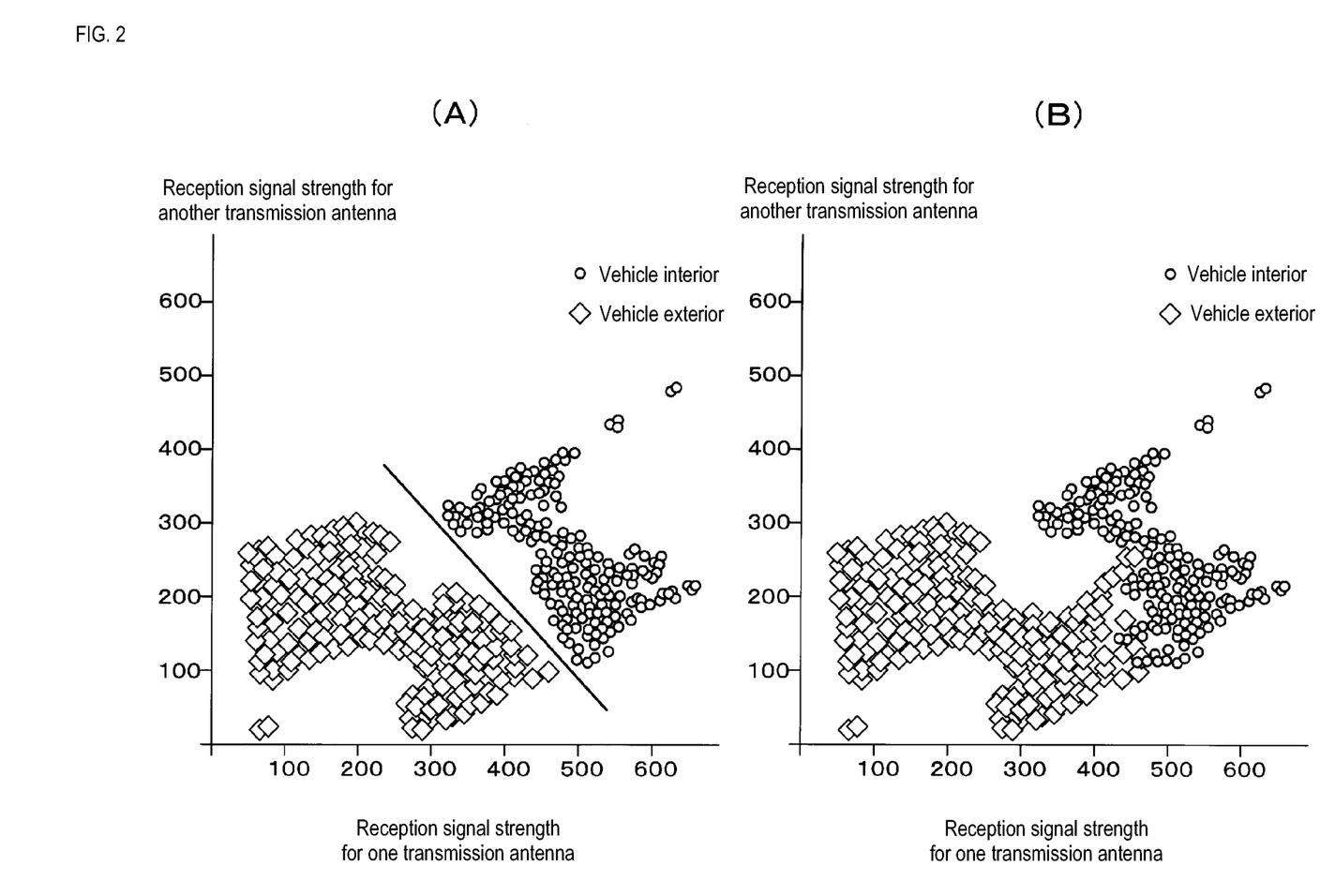
FIG. 2 shows diagrams showing examples in which reception signal strengths measured inside and outside a vehicle by a portable device are represented in a two-dimensional coordinate system.

FIG. 2 shows diagrams showing examples in which reception signal strengths measured by the portable device 2 inside and outside the vehicle are represented in a two-dimensional coordinate system. In FIG. 2, the reception signal strength for the signals from one transmission antenna and the reception signal strength for the signals from another transmission antenna are represented by the X axis (one transmission antenna) and the Y axis (another transmission antenna), respectively. In FIG. 2, a coordinate point that can be defined by the value of each of the reception signal strengths measured by the portable device 2 at a predetermined position is plotted using an open circle or an open diamond. In FIG. 2(A) and FIG. 2(B), the open diamonds indicate measurement results relating to the vehicle exterior, and the open circles indicate measurement results relating to the vehicle interior.

FIG. 2(A) shows a two-dimensional distribution in which the coordinate points relating to the results of the measurement performed inside the vehicle and the coordinate points relating to the results of the measurement performed outside the vehicle are not mixed. In the case of FIG. 2(A), a determination expression (represented by the solid line in FIG. 2(A)) for dividing the results (coordinate points) of the measurement performed inside the vehicle from the results (coordinate points) of the measurement performed outside the vehicle can be easily obtained from the two-dimensional distribution of the coordinate points.

However, FIG. 2(B) shows a two-dimensional distribution in which the results (coordinate points) of the measurement performed inside the vehicle and the results (coordinate points) of the measurement performed outside the vehicle are mixed (partially overlap). In the case of FIG. 2(B), it is difficult to derive a determination expression for dividing the results (coordinate points) of the measurement performed inside the vehicle from the results (coordinate points) of the measurement performed outside the vehicle.

In this respect, the processing device 1 according to the present embodiment is configured to solve this problem. In the following, this will be described in detail.

Figure 3:
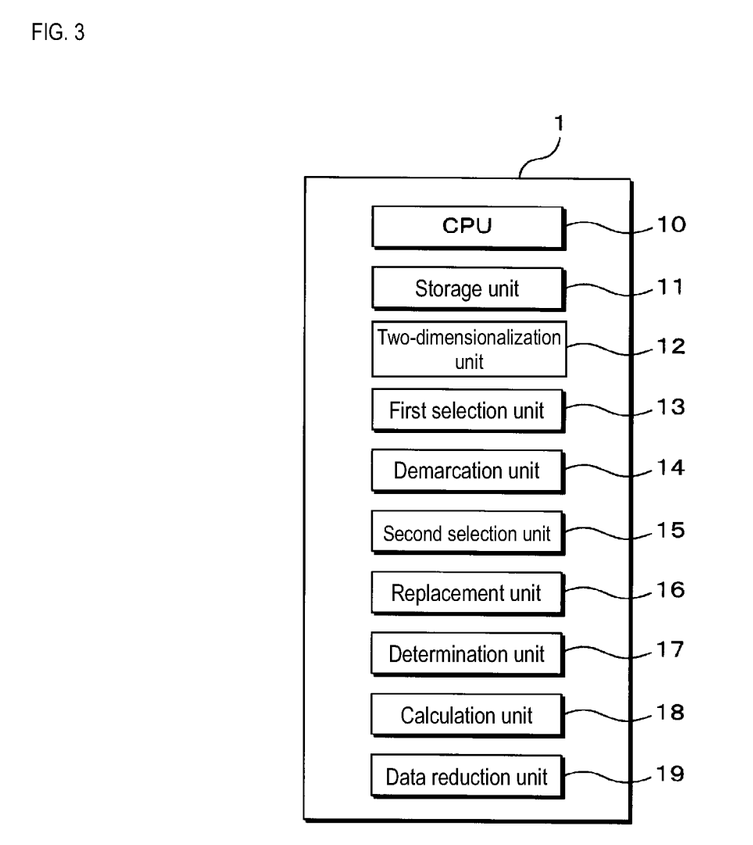
FIG. 3 is a functional block diagram showing an example of the configuration of relevant units of a processing device according to the present embodiment.

FIG. 3 is a functional block diagram showing an example of the configuration of relevant units of the processing device 1 according to the present embodiment. The processing device 1 according to the present embodiment includes a CPU 10, a storage unit 11, a two-dimensionalization unit 12, a first selection unit 13, a demarcation unit 14, a second selection unit 15, a replacement unit 16, a determination unit 17, a calculation unit 18, and a data reduction unit 19.

The storage unit 11 is a nonvolatile memory such as an electrically erasable programmable ROM (EEPROM) or a flash memory. The storage unit 11 stores a control program for deriving a determination expression used for determining the location of the portable device 2 by the CPU 10 controlling operations of the constituent elements of the processing device 1. In addition, the storage unit 11 stores a threshold used for determination performed by the determination unit 17.

The two-dimensionalization unit 12 represents, in a two-dimensional coordinate system, the reception signal strengths (detection strengths) for any one pair of transmission antennas 3 (sources) that have been detected inside the vehicle (first detection position) and outside the vehicle (second detection position). As shown in FIG. 2, the two-dimensionalization unit 12 plots the reception signal strengths in a two-dimensional coordinate system as a two-dimensional distribution of coordinate points that are defined by the values of the reception signal strengths, with the X axis and the Y axis respectively representing the reception signal strengths for the signals from the two transmission antennas. That is, the two-dimensionalization unit 12 converts the detection results of the reception signal strengths into a two-dimensional distribution.

Since three transmission antennas 31, 32, and 33 are used in the present embodiment, there may be $_3C_2$ (three) possible combinations of transmission antenna pairs. The two-dimensionalization unit 12 performs the above-described conversion into a two-dimensional distribution for the reception signal strengths of all transmission antenna pairs.

In the following coordinate points relating to detection results obtained inside the vehicle will be referred to as "vehicle-interior detection coordinate points", and coordinate points relating to detection results obtained outside the vehicle will be referred to as "vehicle-exterior detection coordinate points".

The first selection unit 13 performs, based on the detection results (coordinate points) of the reception signal strengths that have been converted into a two-dimensional distribution, primary selection for selecting the transmission antenna pair for which the overall mixing ratio of coordinate points is smallest, from all of the transmission antenna pairs. The mixing ratio of coordinate points is obtained based on the area of a mixed region including a portion in which the vehicle-interior detection coordinate points and the vehicle-exterior detection coordinate points are mixed. The details of the method for obtaining the mixing ratio of coordinate points will be described later.

The demarcation unit 14 demarcates a predetermined region including the mixed region of vehicle-interior detection coordinate points and vehicle-exterior detection coordinate points by surrounding the predetermined region by a specific figure for a selected transmission antenna pair (hereinafter simply referred to as a "selected pair") that has been selected in the primary selection. The figure is a square, for example. The square is the smallest square including the entire mixed region. The use of a square facilitates subsequent processing (calculation). However, the figure is not limited thereto, and may be a circle or a triangle. Hereinafter, a region that has been demarcated by the demarcation unit 14 and includes the mixed region is referred to as a "demarcated region".

The second selection unit 15 performs secondary selection for selecting another transmission antenna pair for which the mixing ratio of coordinate points in a region corresponding to the demarcated region is smaller than the mixing ratio of coordinate points in the demarcated region.

Specifically, the second selection unit 15 compares the area of the mixed region in the demarcated region with the area of the mixed region in a region corresponding to the demarcated region (hereinafter referred to as a "corresponding region") for all the other transmission antenna pairs except for the selected pair (selected source pair). Based on the results of the comparison, the second selection unit 15 performs the secondary selection.

The replacement unit 16 replaces the two-dimensional distribution of coordinate points in the demarcated region for the selected pair with the two-dimensional distribution of coordinate points relating to another transmission antenna pair. In other words, the replacement unit 16 replaces the two-dimensional distribution of coordinate points of the demarcated region for the selected pair with the two-dimensional distribution of coordinate points of the corresponding region for the transmission antenna pair selected by the second selection unit 15.

The determination unit 17 determines, for the transmission antenna pair selected by the second selection unit 15, whether or not the mixing ratio of coordinate points in a corresponding region corresponding to the demarcated region for the selected pair is greater than a predetermined threshold. The following description will be given, taking, as an example, a case where the threshold is "0%". However, the present embodiment is not limited thereto. The threshold may be any value within the range of 0 to 10%, for example.

The data reduction unit 19 performs processing for reducing the number of data pieces for the detection results (reception signal strengths), based on the result of the determination performed by the determination unit 17. For example, if the determination unit 17 determines that the mixing ratio of coordinate points in the corresponding region for the transmission antenna pair selected by the second selection unit 15 is greater than the threshold, the data reduction unit 19 performs processing for reducing the number of data pieces, such as thinning, for the results (reception signal strengths) of the detection performed by the portable device 2.

After the two-dimensional distribution of coordinate points of the corresponding region for the transmission antenna pair selected by the second selection unit 15 has been replaced with the two-dimensional distribution of coordinate points of the demarcated region for the selected pair, the calculation unit 18 calculates a primary expression for dividing the vehicle-interior detection coordinate points from the vehicle-exterior detection coordinate points. That is, the calculation unit 18 calculates a primary determination expression for specifying a boundary between the vehicle-interior detection coordinate points and the vehicle-exterior detection coordinate points for the two-dimensional distribution of the detection results of the reception signal strength obtained after the replacement processing performed by the replacement unit 16.

The CPU 10 causes the overall device to operate as the processing device 1 according to the present embodiment by controlling the above-described constituent elements by loading a control program stored in advance in the storage unit 11 or a ROM (not shown) onto a RAM (not shown) and executing the program.

Figure 4:
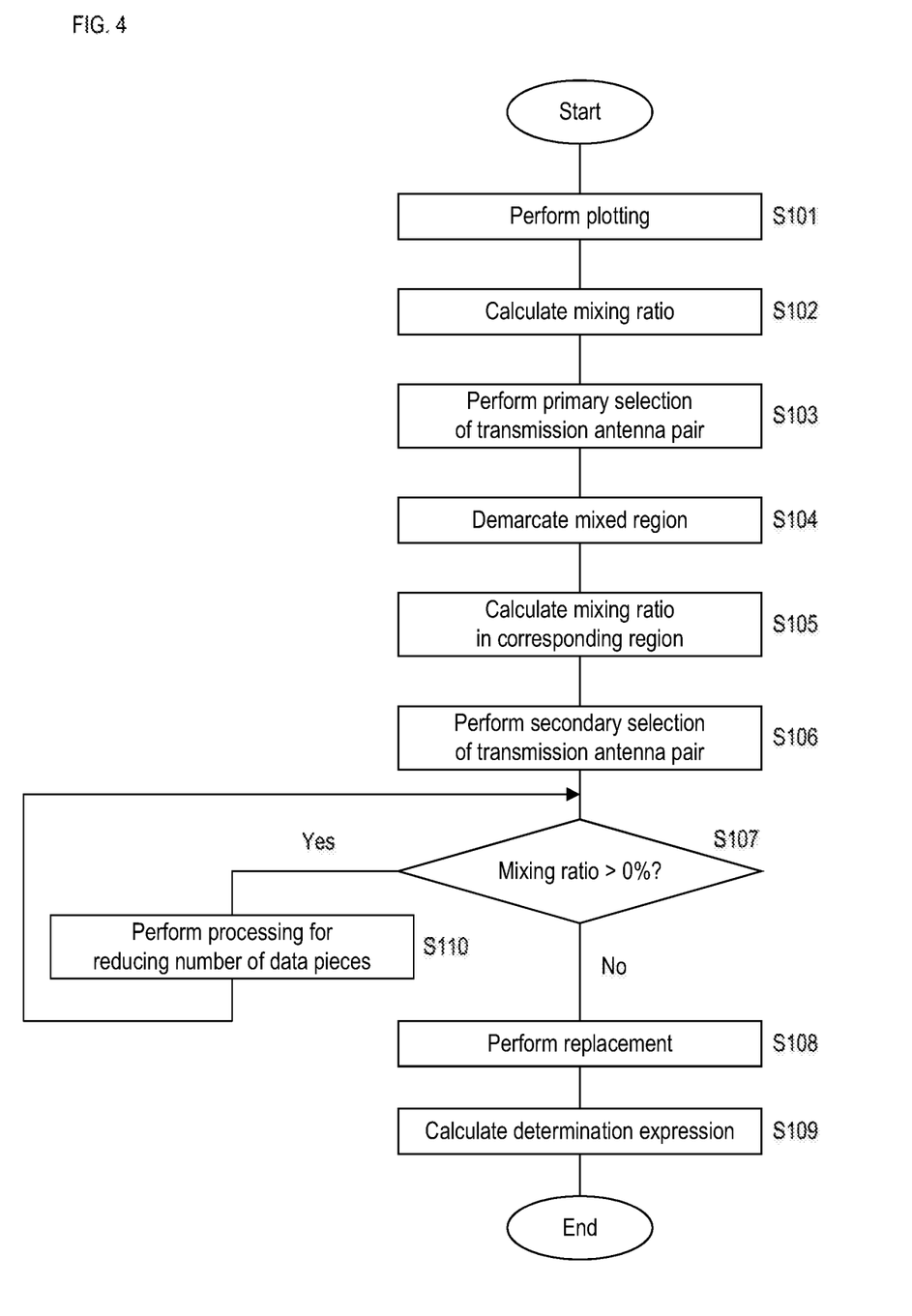
FIG. 4 is a flowchart illustrating an example of processing performed in the processing device according to the present embodiment.

FIG. 4 is a flowchart illustrating an example of processing performed in the processing device 1 according to the present embodiment. The following describes processing for deriving a determination expression for dividing vehicle-interior detection coordinate points from vehicle-exterior detection coordinate points when the vehicle-interior detection coordinate points and the vehicle-exterior detection coordinate points are mixed as shown in FIG. 2(B).

First, the reception signal strengths, which have been detected by the portable device 2, for the transmission antennas 31, 32, and 33 are converted into a two-dimensional distribution. That is, the two-dimensionalization unit 12 plots, for all of the transmission antenna pairs including the three transmission antennas 31, 32, and 33, the detection results of the reception signal strengths as a two-dimensional distribution of coordinate points, thus converting the detection results into a two-dimensional distribution (step S101). This processing has already been described, and therefore a detailed description thereof shall be omitted.

Then, based on the obtained two-dimensional distribution of coordinate points, the first selection unit 13 obtains the mixing ratio of the vehicle-interior detection coordinate points and the vehicle-exterior detection coordinate points for all of the transmission antenna pairs (step S102).

Figure 5:
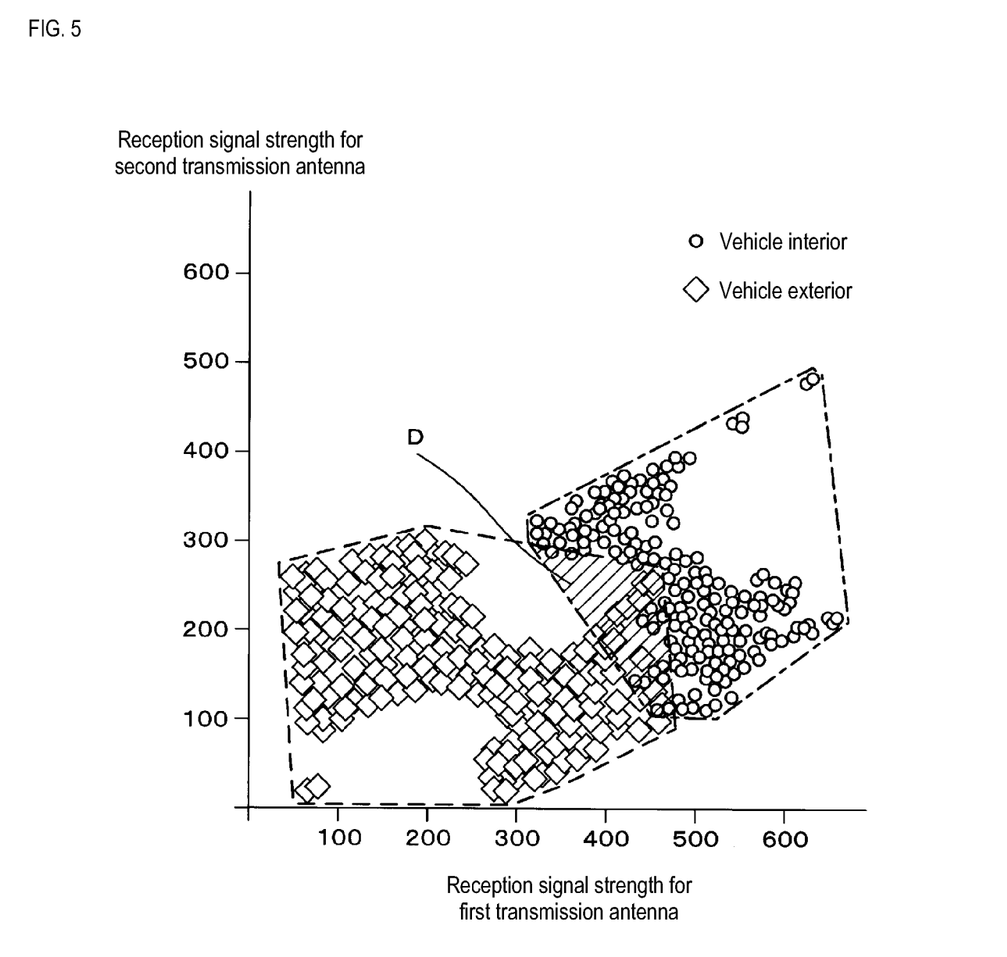
FIG. 5 is an explanatory diagram showing, in a two-dimensional distribution of reception signal strengths (coordinate points), a mixed region including a portion in which coordinate points detected inside a vehicle and coordinate points detected outside the vehicle are mixed.

The following describes how to obtain the mixing ratio of coordinate points. FIG. 5 is an explanatory diagram showing a mixed region including a portion in which the vehicle-interior detection coordinate points and the vehicle-exterior detection coordinate points are mixed in a two-dimensional distribution of the reception signal strengths (coordinate points). Note that, in FIG. 5, for the sake of convenience, the X axis represents the reception signal strength for the first transmission antenna 31, and the Y axis represents the reception signal strength for the second transmission antenna 32.

First, a group of vehicle-interior detection coordinate points and a group of vehicle-exterior detection coordinate points are each enclosed by a straight line. More specifically, the coordinate points that are most spaced apart from each other in each of the groups are connected with straight lines, to give a predetermined polygon. The portion in which the polygon (indicated by the dashed dotted line) for the group of the vehicle-interior detection coordinate points and the polygon (indicated by the dotted line) for the group of the vehicle-exterior detection coordinate points overlap each other is referred to as a mixed region D (see the hatched portion in FIG. 5). In addition, the area of the mixed region D relative to the overall area of each polygon is referred to as a mixing ratio of vehicle-interior detection coordinate points and vehicle-exterior detection coordinate points (hereinafter also simply referred to as a "mixing ratio").

Based on the results of the calculation in step S102, the first selection unit 13 performs primary selection for selecting the transmission antenna pair for which the mixing ratio is smallest from all the transmission antenna pairs (step S103). The following description assumes that the transmission antennas 31 and 32 are selected as the selected pair in the primary selection, and that, in FIG. 5, the X axis represents the reception signal strength for the transmission antenna 31 and the Y axis represents the reception signal strength for the transmission antenna 32.

Then, the demarcation unit 14 demarcates, for the selected pair, the mixed region D of the vehicle-interior detection coordinate points and the vehicle-exterior detection coordinate points by surrounding the mixed region D by a square (step S104).

Figure 6:
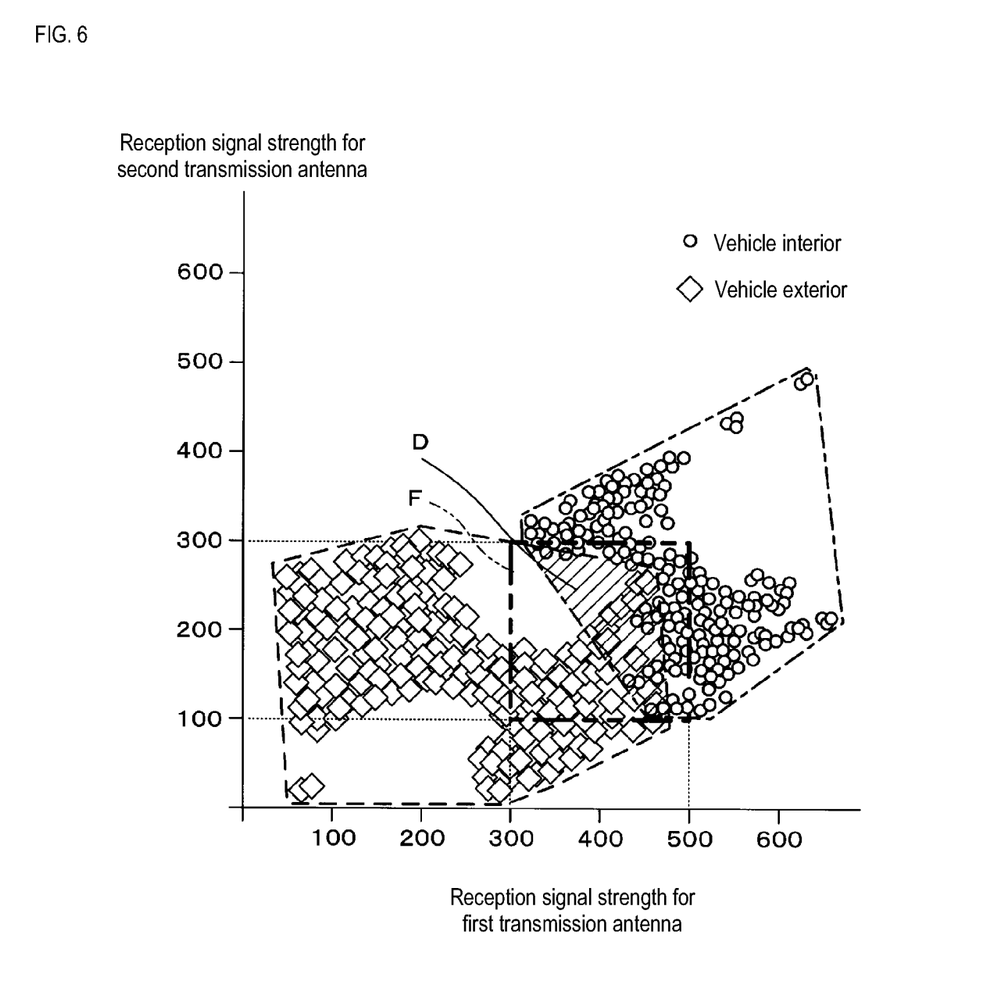
FIG. 6 is an explanatory diagram illustrating processing performed by a demarcation unit in the processing device according to the present embodiment.

FIG. 6 is an explanatory diagram illustrating the processing performed by the demarcation unit 14 in the processing device 1 according to the present embodiment. The demarcation unit 14 surrounds the mixed region D by the smallest square (indicated by the dashed double-dotted line in FIG. 6) including the entire mixed region D. That is, in FIG. 6, a demarcated region F is the region defined by an X-axis range of "300 to 500" and a Y-axis range of "100 to 300".

The second selection unit 15 calculates the mixing ratio in the corresponding region for all the other transmission antenna pairs (transmission antennas 31 and 33, and transmission antennas 32 and 33) except for the selected pair (transmission antennas 31 and 32) (step S105). The calculation of the mixing ratio has already been described, and therefore a description thereof shall be omitted.

Subsequently, based on the results of the calculation in step S105, the second selection unit 15 performs secondary selection for selecting another transmission antenna pair except for the selected pair (step S106). That is, the second selection unit 15 compares the area of the mixed region D in the demarcated region F with the area of the mixed region in the corresponding region for the transmission antenna pair of the transmission antennas 31 and 33 and the transmission antenna pair of the transmission antennas 32 and 33. The second selection unit 15 selects, from the transmission antenna pair of the transmission antennas 31 and 33 and the transmission antenna pair of the transmission antennas 32 and 33, the transmission antenna pair for which the mixing ratio in the corresponding region is smaller than the mixing ratio in the demarcated region F.

The determination unit 17 determines whether or not the mixing ratio in the corresponding region corresponding to the demarcated region F is greater than "0%" for the transmission antenna pair selected by the second selection unit 15 (step S107).

If the determination unit 17 determines that the mixing ratio in the corresponding region for the transmission antenna pair selected by the second selection unit 15 is greater than "0%" (step S107: YES), the data reduction unit 19 performs processing for reducing the number of data pieces, such as thinning, for the detection results (reception signal strengths) obtained by the portable device 2 (step S110). Specifically, the data reduction unit 19 performs processing for reducing the number of data pieces for the detection results (reception signal strengths) for the transmission antenna pair selected by the second selection unit 15. Thereafter, the processing returns to step S107.

The processing device 1 according to the present embodiment is not limited thereto. After the processing for reducing the number of data pieces has been performed by the second selection unit 15, the processing may return to step S101.

On the other hand, if the mixing ratio in the corresponding region for the transmission antenna pair selected by the second selection unit 15 is "0%", the determination unit 17 determines that the mixing ratio in the corresponding region is not greater than "0%" (step S107: NO). In that case, the replacement unit 16 replaces the two-dimensional distribution of coordinate points in the corresponding region for the transmission antenna pair selected by the second selection unit 15 in step S106, with the two-dimensional distribution of coordinate points in the demarcated region F for the selected pair (step S108).

Figure 7:
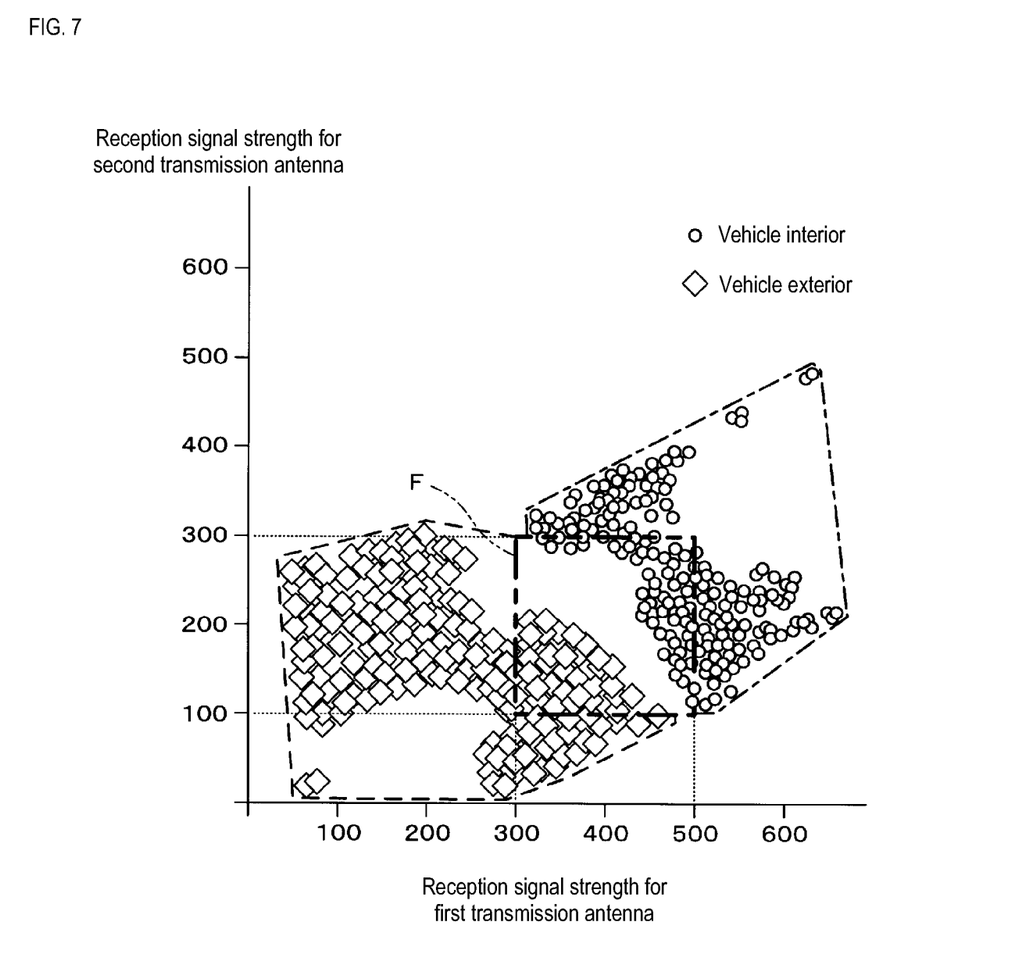
FIG. 7 is a conceptual diagram conceptually illustrating processing performed by a replacement unit in the processing device according to the present embodiment.

FIG. 7 is a conceptual diagram conceptually illustrating the processing performed by the replacement unit 16 in the processing device 1 according to the present embodiment. The replacement unit 16 replaces the two-dimensional distribution of coordinate points corresponding to the corresponding region (with an X-axis range of "300 to 500" and a Y-axis range of "100 to 300") corresponding to the demarcated region F out of the two-dimensional distribution of coordinate points for the transmission antenna pair selected by the second selection unit 15 with the two-dimensional distribution of coordinate points in the demarcated region F for the selected pair. FIG. 7 conceptually shows a result of the processing performed by the replacement unit 16.

Then, the calculation unit 18 calculates, for the two-dimensional distribution of coordinate points obtained by the replacement processing performed by the replacement unit 16 (see FIG. 7), a primary determination expression for specifying a boundary between the vehicle-interior detection coordinate points and the vehicle-exterior detection coordinate points (step S109).

Figure 8:
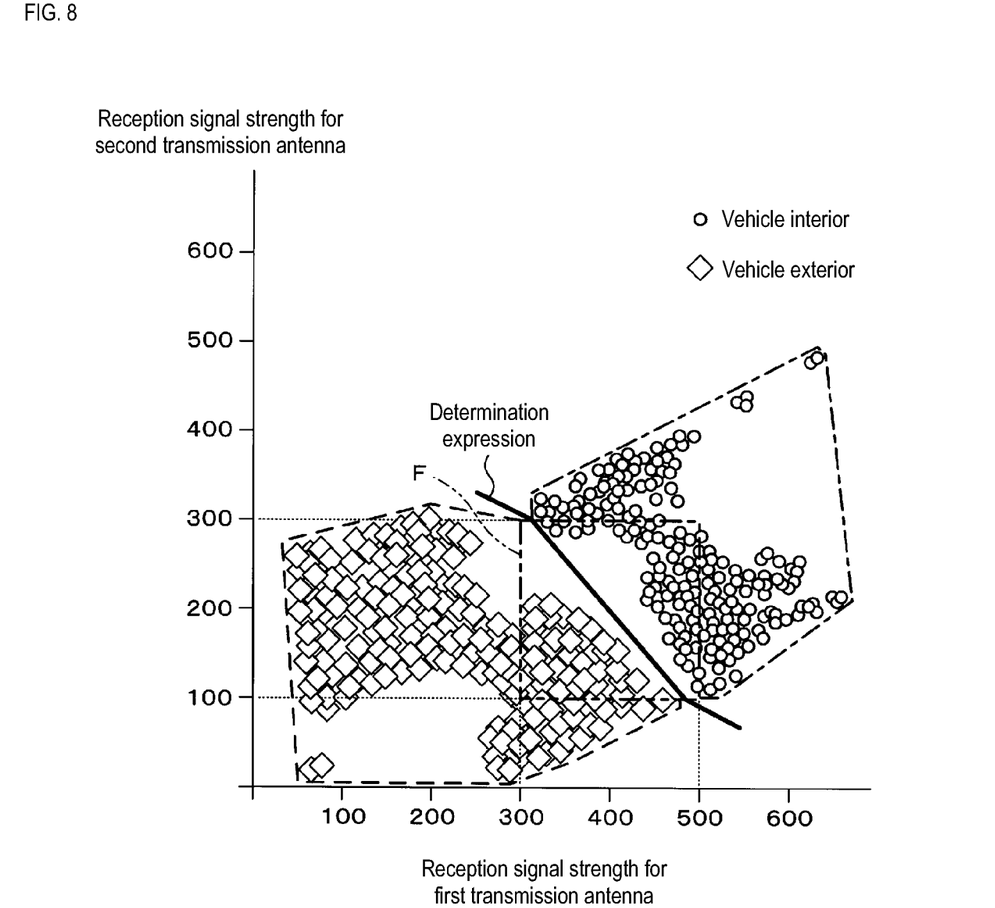
FIG. 8 is a conceptual diagram conceptually illustrating processing performed by a calculation unit in the processing device according to the present embodiment.

FIG. 8 is a conceptual diagram conceptually illustrating the processing performed by the calculation unit 18 in the processing device 1 according to the present embodiment. As shown in FIG. 8, the vehicle-interior detection coordinate points and the vehicle-exterior detection coordinate points neither overlap nor are mixed in the two-dimensional distribution of coordinate points obtained by the replacement processing performed by the replacement unit 16. The calculation unit 18 calculates a determination expression in the demarcated region F (with an X-axis range of "300 to 500" and a Y-axis range of "100 to 300") and determination expressions in regions other than the demarcated region F. FIG. 8 shows the primary determination expression calculated by the calculation unit 18.

The vehicle-mounted device 6 receives reception signal strengths from the portable device 2, and determines whether the user (portable device 2) is located inside or outside the vehicle based on the received reception signal strengths and the determination expressions obtained in the above-described manner by the processing device 1 according to the present embodiment.

When the detection results of the reception signal strengths relating to a pair of transmission antennas are represented as coordinate points in a two-dimensional coordinate system, it is often the case that the mixed region D in which the vehicle-interior detection coordinate points and the vehicle-exterior detection coordinate points are mixed exists. In such a case, it is difficult to clearly divide the vehicle-interior detection coordinate points from the vehicle-exterior detection coordinate points.

In this case, the processing device 1 according to the present embodiment can clearly divide the vehicle-interior detection coordinate points from the vehicle-exterior detection coordinate points by replacing the reception signal strengths with the reception signal strengths (two-dimensional distribution of coordinate points) of another pair of transmission antenna for the mixed region D.

This makes it possible to easily calculate an accurate determination expression for specifying a boundary between the vehicle-interior detection coordinate points and the vehicle-exterior detection coordinate points. In addition, by using a determination expression calculated in this manner, the accuracy in determining, for example, the location of the portable device 2 is also increased.

The foregoing has described, taking, as an example, a case where three transmission antennas 31, 32, and 33 are used. However, the present embodiment is not limited thereto, and is also applicable to a case where more than three transmission antennas are used.

Note that the present embodiment is not limited to the above description. The two-dimensionalization unit 12, the first selection unit 13, the demarcation unit 14, the second selection unit 15, the replacement unit 16, the determination unit 17, the calculation unit 18, and the data reduction unit 19 described above may be configured by hardware logic, or may be constructed through software by the CPU 10 executing a predetermined program.

Figure 9:
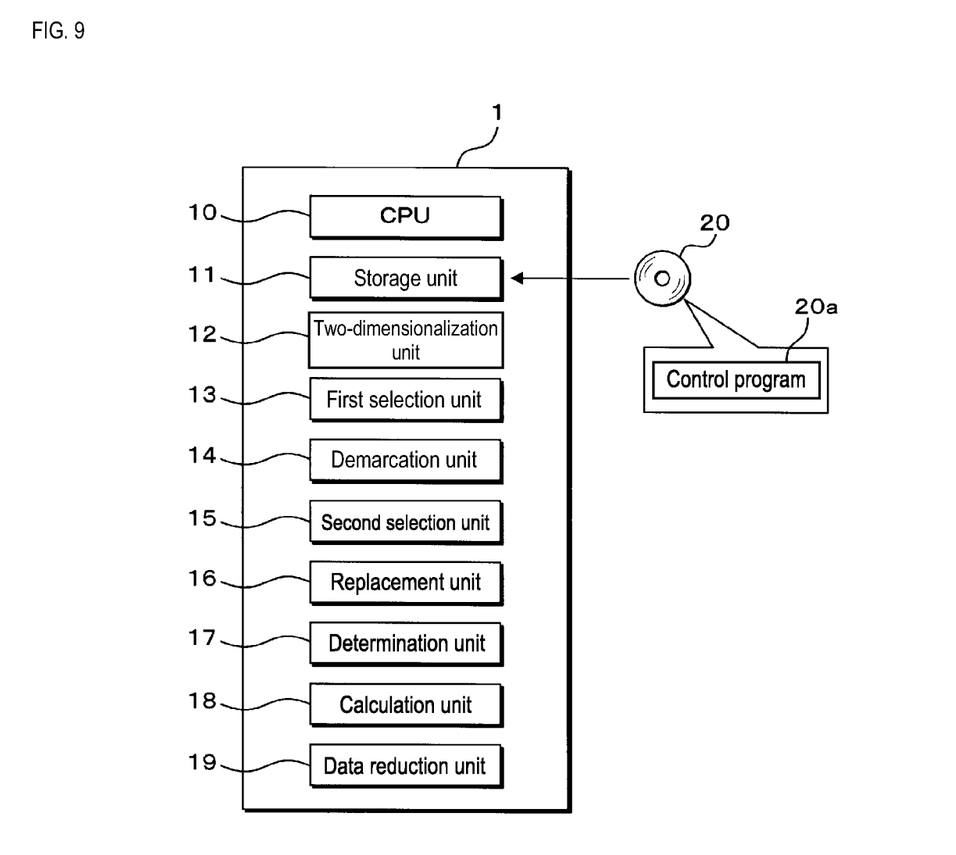
FIG. 9 is a functional block diagram showing another example of the configuration of relevant units of the processing device according to the present embodiment.

FIG. 9 is a functional block diagram showing another example of the configuration of relevant units of the processing device 1 according to the present embodiment. The processing device 1 according to the present embodiment may be configured to acquire a control program 20*a* from a recording medium 20.

The control program 20*a* may be recorded in the recording medium 20 in a computer-readable manner. The storage unit 11 stores the control program 20*a* that has been read out from the recording medium 20 by a readout device (not shown). The recording medium 20 is an optical disc such as a compact disc (CD)-ROM, a digital versatile disc (DVD)-ROM, a Blu-ray (registered trademark) disc (BD), a magnetic disc such as a flexible disc and a hard disc, a magneto-optical disc, a semiconductor memory, or the like. Alternatively, the control program 20*a* according to the present embodiment may be downloaded from an external computer (not shown) connected to a communication network (not shown), and may be stored in the storage unit 11.

The control program 20*a* may contain a program for the CPU 10 to construct the two-dimensionalization unit 12, the first selection unit 13, the demarcation unit 14, the second selection unit 15, the replacement unit 16, the determination unit 17, the calculation unit 18, and the data reduction unit 19 through software.

It should be appreciated that the embodiments disclosed herein are to be construed in all respects as illustrative and not limiting. The scope of the present disclosure is defined by the claims, rather than by the description preceding them, and is intended to include all modifications which fall within the scope of the claims and the meaning and scope of equivalents thereof.

The invention claimed is:

1. A processing device that processes, for each detection position, detection strengths detected at a first detection position and a second detection position by a detector for detecting detection targets generated from a plurality of sources, the processing device comprising:
   a two-dimensionalization unit configured to convert detection strengths for any one pair of sources into a two-dimensional distribution of coordinate points in which the detection strength for one source is represented by an X-axis value, and the detection strength for the other source is represented by a Y-axis value;

a demarcation unit configured to demarcate, in the two-dimensional distribution of coordinate points, a predetermined region including a mixed region in which coordinate points relating to the first detection position and coordinate points relating to the second detection position are mixed; and a replacement unit configured to replace the two-dimensional distribution of coordinate points in a demarcated region that has been demarcated, with a two-dimensional distribution of coordinate points relating to another pair of sources.

2. The processing device according to claim 1, comprising:

a calculation unit configured to calculate, after the replacement performed by the replacement unit, a primary expression for dividing the coordinate points relating to the first detection position from the coordinate points relating to the second detection position.

3. The processing device according to claim 1, wherein the plurality of sources are three or more sources, the processing device comprises a first selection unit configured to select a source pair for which a mixing ratio at which the coordinate points relating to the first detection position and the coordinate points relating to the second detection position are mixed in the two-dimensional distribution of coordinate points is smallest, and the demarcation unit demarcates the predetermined region for a selected source pair that has been selected by the first selection unit.

4. The processing device according to claim 3, comprising:

a second selection unit configured to select another source pair for which the mixing ratio in a corresponding region corresponding to the demarcated region is smaller than the mixing ratio in the demarcated region, wherein the replacement unit replaces the two-dimensional distribution of coordinate points in the demarcated region with the two-dimensional distribution of coordinate points in the corresponding region for the source pair selected by the second selection unit.

5. The processing device according to claim 4, comprising:

a determination unit configured to determine, for the source pair selected by the second selection unit, whether or not a mixing ratio of coordinate points in the corresponding region is greater than a predetermined threshold; and a data reduction unit configured to perform, based on a result of the determination, processing for reducing the number of data pieces for the detection strengths.

6. A processing method for processing, for each detection position, detection strengths detected at a first detection position and a second detection position by a detector for detecting detection targets generated from a plurality of sources, the processing method comprising the steps of:

converting detection strengths for any one pair of sources into a two-dimensional distribution of coordinate points in which the detection strength for one source is represented by an X-axis value, and the detection strength for the other source is represented by a Y-axis value;

demarcating, in the two-dimensional distribution of coordinate points, a predetermined region including a mixed region in which coordinate points relating to the first detection position and coordinate points relating to the second detection position are mixed; and replacing the two-dimensional distribution of coordinate points in a demarcated region that has been demarcated, with a two-dimensional distribution of coordinate points relating to another pair of sources.

7. A computer program for causing a computer to execute processing for, based on detection strengths detected at a first detection position and a second detection position by a detector for detecting detection targets generated from a plurality of sources, converting detection strengths for any one pair of sources into a two-dimensional distribution of coordinate points in which the detection strength for one source is represented by an X-axis value, and the detection strength for the other source is represented by a Y-axis value;

demarcating, in the two-dimensional distribution of coordinate points, a predetermined region including a mixed region in which coordinate points relating to the first detection position and coordinate points relating to the second detection position are mixed; and replacing the two-dimensional distribution of coordinate points in a demarcated region that has been demarcated, with a two-dimensional distribution of coordinate points relating to another pair of sources.

8. The processing device according to claim 2, wherein the plurality of sources are three or more sources, the processing device comprises a first selection unit configured to select a source pair for which a mixing ratio at which the coordinate points relating to the first detection position and the coordinate points relating to the second detection position are mixed in the two-dimensional distribution of coordinate points is smallest, and the demarcation unit demarcates the predetermined region for a selected source pair that has been selected by the first selection unit.

* * * * *